United States Patent [19]
Minami et al.

[11] Patent Number: 5,721,808
[45] Date of Patent: Feb. 24, 1998

[54] METHOD FOR THE COMPOSITION OF NOISE-RESISTANT HIDDEN MARKOV MODELS FOR SPEECH RECOGNITION AND SPEECH RECOGNIZER USING THE SAME

[75] Inventors: Yasuhiro Minami, Tachikawa; Tomoko Matsui, Mitaka; Sadaoki Furui, Tokyo, all of Japan

[73] Assignee: Nippon Telegraph and Telephone Corporation, Tokyo, Japan

[21] Appl. No.: 610,614

[22] Filed: Mar. 4, 1996

[30] Foreign Application Priority Data

Mar. 6, 1995 [JP] Japan ................. 7-045304
Dec. 21, 1995 [JP] Japan ................. 7-333335

[51] Int. Cl.$^6$ ............................................. G10L 5/06
[52] U.S. Cl. ............ 395/2.65; 395/2.25; 395/2.35; 395/2.42
[58] Field of Search ............... 395/2.25, 2.35, 395/2.4, 2.42, 2.49, 2.65

[56] References Cited

U.S. PATENT DOCUMENTS 4,933,973  6/1990  Porter .................. 395/2.42
5,590,242  12/1996 Juang et al. ............ 395/2.54

OTHER PUBLICATIONS

Minami et al. "A Maximum Likelihood Procedure for a Universal Adaptation Method based on HMM Composition." NTT Human Interface laboratories, Tokyo, pp. 129–132, 1995.

R.C. Rose et al. "Integrated Models of Signal and Background with Application to Speaker Identification in Noise." IEEE Transactions on Speech and Audio Processing, vol. 2, pp. 245–257, Apr. 1994.

Juang et al. "Signal Bias Removal for Robust Telephone Based Speech Recognition in adverse Environments." Proc. ICASSP'94, pp. 1445–1448, Apr. 1994.

*Primary Examiner*—Allen R. MacDonald
*Assistant Examiner*—Alphonso A. Collins
*Attorney, Agent, or Firm*—Pollock, Vande Sande & Priddy

[57] ABSTRACT

Noise-resistant speech HMMs are composed by: recording noise in the environment of utterance ($S_1$); preparing HMMs of the noise ($S_2$); transforming the output probability distribution of each of the noise HMMs and speech HMMs prepared from speech unaffected by noise and multiplicative distortion to a linear spectral domain ($S_{31}$); multiplying the speech HMM distribution in the linear spectral domain by a multiplicative distortion W that is an unknown variable ($S_{321}$); convoluting the multiplied value and the noise HMM distribution in the linear spectral domain ($S_{322}$); inversely transforming the convoluted value to the original domain of the speech HMM ($S_{33}$) to compose incomplete noise-resistant speech HMMs each containing multiplicative distortion as an unknown variable ($S_3$); calculating the likelihoods of the incomplete noise-resistant speech HMMs for input speech and estimating the multiplicative distortion of that one of the incomplete noise-resistant HMMs which has the maximum likelihood ($S_4$); and substituting the estimated value into the incomplete noise-resistant speech HMMs ($S_5$).

21 Claims, 8 Drawing Sheets

FIG. 3
PRIOR ART
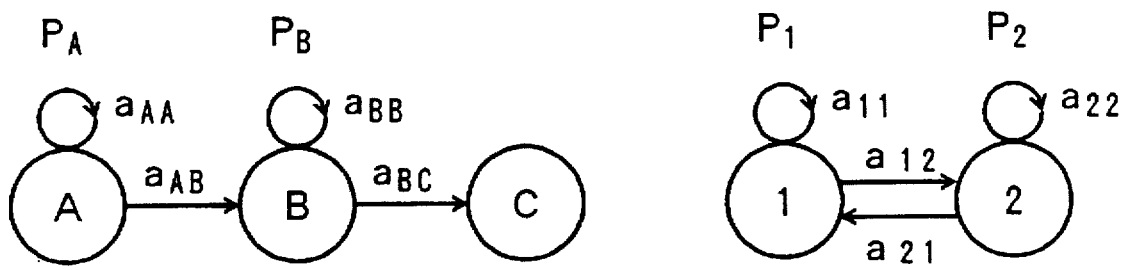
SPEECH HMM              NOISE HMM
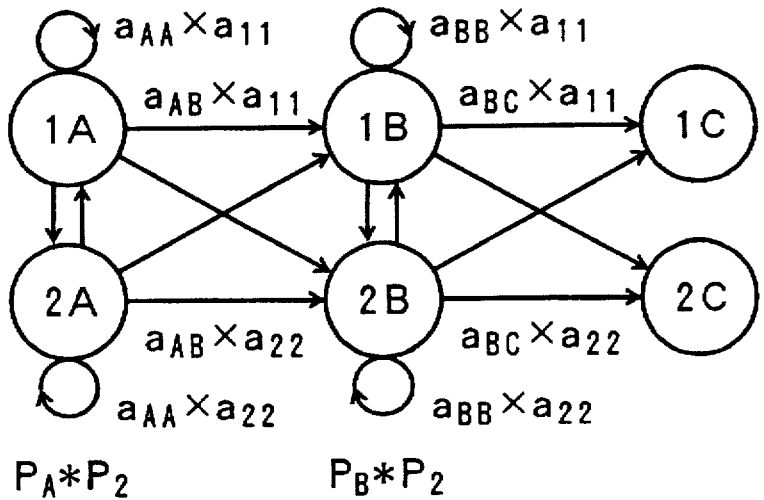
NOISE-RESISTANT SPEECH HMM

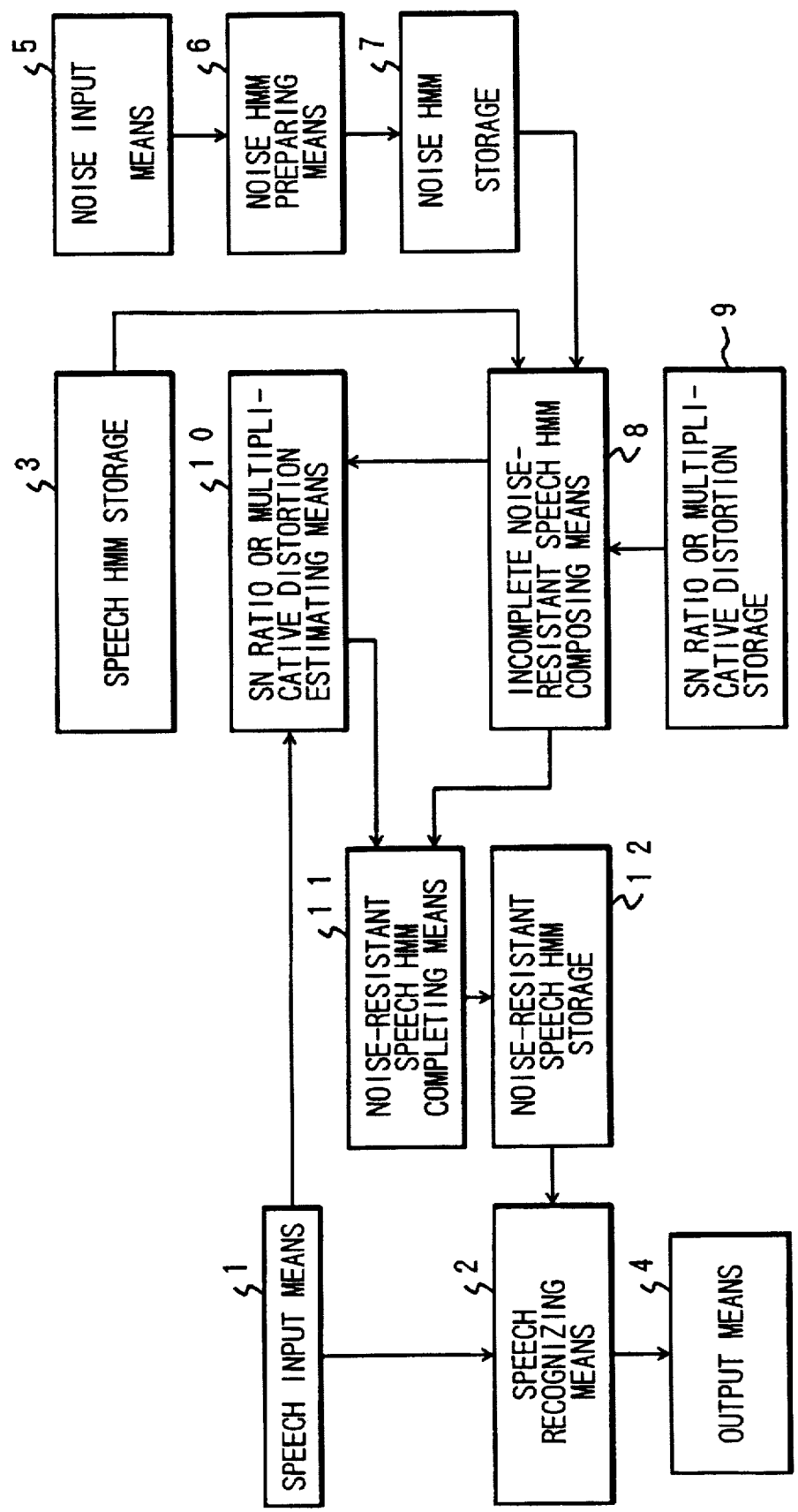

METHOD FOR THE COMPOSITION OF NOISE-RESISTANT HIDDEN MARKOV MODELS FOR SPEECH RECOGNITION AND SPEECH RECOGNIZER USING THE SAME

BACKGROUND OF THE INVENTION

The present invention relates to a method for the composition of noise-resistant Hidden Markov Models (hereinafter referred to as HMMs) which are suitable for the recognition of speech added with background noise or speech subjected to multiplicative distortions resulting from the transmission over a telephone line, for instance, and the invention also pertains to a speech recognizer using the method.

A description will be given first, with reference to FIG. 1, of a prior art example of a speech recognition method using HMMs. Speech input via speech input means 1 is fed to speech recognizing means 2, wherein the similarity of its HMMs to speech HMMs stored in speech HMM storage 3 is computed, and the observation based on the computation is provided via output means 4.

Conventionally, speech HMMs are generally composed on the basis of speech information obtained in noise-free conditions. The speech HMMs thus obtained are free from the influence of noise, and hence when computing their similarity to input speech affected by noise in noisy environments or input speech distorted by the transmission over a telephone line, the speech HMMs become unsuitable, resulting in serious degradation of the speech recognition performance.

On the other hand, there has been proposed a method that records speech affected by noise in noisy environments and prepares speech HMMs from the recorded speech. With this method, however, since the kind of noise is enormous, the entire speech recognizer would inevitably become bloated or bulky with an increase in the degree of recognition performance required.

Further, in the case of creating speech HMMs from training speech recorded in actual environments, the training speech needs to be, for instance, as long as 24 hours or so, besides the creation of the speech HMMs requires as long a time as about two months, for example. Thus it is impossible so far to implement simple and fast creation of the speech HMM from training speech recorded for each environment.

In view of the above, there is proposed in Literature 1 (F. Martin, K. Shikano and Y. Minami, "Recognition of Noisy Speech by Composition of Hidden Markov Models," ISSN 1018-4074 (Volume 2) ESCA, pp. 1031–1034) a speech recognition method that composes noise-resistant HMMs suitable to actual environments in a short time and relatively easily and achieves high recognition rates under noisy environments. The present invention is an improvement on this prior art method. A brief description will be given of the scheme for the composition of noise-resistant speech HMMs that is employed in this prior art.

With the conventional method, noise is recorded in actual environments, then noise HMMs are composed from the recorded noise, and the noise HMMs and speech HMMs free from noise or multiplicative distortions are combined in a product space as shown in FIG. 2. Cepstrum coefficients are widely used as acoustic parameters for use in HMMs for speech recognition. The cepstrum coefficient bears a "cosine transform" relationship with a logarithm spectrum (a logarithm power spectrum).

Assume that noise and speech HMMs are both made in the cepstral domain. The distributions of output probabilities of the noise and speech HMMs are cosine-transformed to compute distributions on their logarithm spectra ($S_{311}$). Then the distributions on the logarithm spectra are exponentially transformed to compute distributions on their linear spectra ($S_{312}$). The distributions of the noise and speech HMMs thus transformed into linear spectra are convoluted ($S_{32}$), followed by a logarithm transformation of the combined HMM ($S_{331}$) and by its inverse cosine transformation to compose a noise-resistant speech HMM ($S_{332}$).

Let it be assumed here that the distributions of output probabilities of the speech and noise HMMs are represented by HMMs using a mixture of normal distributions (what is called a Gaussian mixture). Since the normal distributions can be represented by their mean value and a covariance, each transformation in FIG. 2 involves the transformation of the mean value and the covariance. Next, a description will be given of the above transformation scheme when the distribution of the HMM output probability is normal.

In the first place, consider zero- to p-order cepstrum coefficients as parameters of the distributions of the HMM output probabilities and represent them as follows:

$$C = (C_0\ C_1\ C_2\ \ldots\ C_{p-1}\ C_p) \quad (1)$$

$$D = (D_0\ D_1\ D_2\ \ldots\ D_{p-1}\ D_p) \quad (2)$$

where C represents a mean value of the speech HMM distributions and D represents a mean value of the noise HMM distributions. The transformation from the cepstrum coefficient to the logarithm spectrum is known as a cosine transformation; this is a linear transformation and is represented as a (p+1) by m transformation matrix (COS), where m is the order of the logarithm spectrum. Letting the vectors of logarithm spectra of the mean values of the speech and noise HMM distributions be represented by LC and LD, respectively, they are given as follows (FIG. 2, $S_{311}$):

$$LC = C(COS) \quad (3)$$

$$LD = D(COS) \quad (4)$$

Letting covariances of the speech and noise HMM distributions in the cepstral domain be represented by $\Sigma^C$ and $\Sigma^D$, respectively, covariances $\Sigma^{LC}$ and $\Sigma^{LD}$ of these distributions in the logarithm spectral domain are given as follows:

$$\Sigma^{LC} = (COS)\Sigma^C(COS)^t \quad (5)$$

$$\Sigma^{LD} = (COS)\Sigma^D(COS)^t \quad (6)$$

where t represents transposed matrices. In this way, the mean values and covariances of the normal distributions of the speech and noise HMMs in the logarithm spectral domain are obtained (FIG. 2, $S_{311}$).

Next, a description will be given of the exponential transformation for transforming the logarithm spectrum to a linear one. This transformation does not take the form of a normal distribution, but the transformation is approximated by a normal distribution. Computing mean values SC, SD and covariances $\Sigma^{SC}$, $\Sigma^{SD}$ of respective distributions when exponentially transforming the mean values LC, LD and covariances $\Sigma^{LC}$, $\Sigma^{LD}$ in the logarithm spectral domain, they are given as follows ($S_{312}$):

$$SC^i = \exp(LC^i + \Sigma^{LC}_{ii}/2) \quad (7)$$

$$SD^i = \exp(LD^i + \Sigma^{LD}_{ii}/2) \quad (8)$$

$$\Sigma^{SC}_{ij} = SC^i \times SC^j \times \{\exp(\Sigma^{LC}_{ij}) - 1\} \quad (9)$$

$$\Sigma^{SD}_{ij} = SD^i \times SD^j \times \{\exp(\Sigma^{LD}_{ij}) - 1\} \quad (10)$$

where: i, j=0, 1, 2, ..., p.

The background noise is an additive noise; namely, speech and noise can be added in the linear spectral domain. The mean value M and covariance $\Sigma^M$ of the noise-resistant speech HMM distribution, which is the sum of distributions of speech and noise HMMs in the linear spectral domain, is calculated by the following equations (FIG. 2, $S_{32}$):

$$M^i = SC^i + SD^i \tag{11}$$

$$\Sigma^M_{ij} = \Sigma^{SC}_{ij} + \Sigma^{SD}_{ij} \tag{12}$$

The mean value $M^i$ and covariance $\Sigma^M$ of the distribution thus obtained are transformed to the cepstral domain in reverse order to the steps taken so far. This procedure begins with a logarithm transformation that is an inverse version of the exponential transformation. Letting the logarithm-transformed mean value and covariance be represented by LM and $\Sigma^{LM}$, respectively, they are given as follows (FIG. 2, $S_{331}$):

$$LM^i = \log(M^i) - \tfrac{1}{2}\log(\Sigma^M_{ij}/M^{i2}+1) \tag{13}$$

$$\Sigma^{LM}_{ij} = \log(\Sigma^M_{ij}/(M^iM^j)+1) \tag{14}$$

Further, the logarithm spectrum is transformed into the cepstral domain by an inverse cosine transformation (COS') m×(p+1) and the mean value S and covariance $\Sigma^S$ of the noise-resistant speech HMM output probability distribution are computed by the following equations (FIG. 2, $S_{332}$):

$$S = LM(COS') \tag{15}$$

$$\Sigma^S = (COS')\Sigma^{LM}(COS')^t \tag{16}$$

When the distribution is a single normal distribution, the above transformation needs only to be performed using two distributions. When the distribution is a mixture of normal distributions, the transformation needs only to be performed for all possible combinations of distributions. Accordingly, for example, when the speech HMM is a mixture of three normal distributions and the noise HMM is a mixture of three normal distributions, the noise-resistant speech HMM will be a mixture of 3×3=9 normal distributions.

The foregoing description has been given of a method for combining single distributions in the speech and noise HMMs. Usually the speech HMM can be represented by a model that has three right-to-left transition states A, B and C as shown at the upper left in FIG. 3. On the other hand, an ergodic HMM that transitions between two states 1 and 2 as shown at the upper right in FIG. 3 is suitable as a noise model. In this instance, the noise-resistant speech HMM becomes a product model such as depicted at the bottom in FIG. 3, which has six states 1A, 1B, 1C, 2A, 2B and 2C, each composed of a combination of the states of the speech and noise HMMs. For example, the state 1A is a combination of the state A of the speech HMM and the state 1 of the noise HMM, and the output distribution in the state 1A is $P_A * P_1$, where $P_A$ represents the distribution in the state A of the speech HMM, $P_1$ represents the distribution in the state 1 of the noise HMM and * represents the transformation described above with reference to FIG. 2. For each of the states 1B, 1C and 2a to 2C, such an operation is performed using the distributions in the states of the corresponding speech and noise HMMs. Further, the probability of transition of the noise-resistant speech HMM between the states takes the form of the product of the inter-state transitions of the speech and noise HMMs as depicted at the bottom in FIG. 3. For instance, the transition probability from the state 1A to 1B is given as the product ($a_{AB} \times a_{11}$) of the transition probability $a_{AB}$ of the speech HMM from the state A to B and the transition probability $a_{11}$ of the noise HMM from the state 1 to 1.

With this traditional method, it is surely possible to obtain speech HMMs somewhat robust against the additive noise. Furthermore, already-existing sets of speech HMMs can be used, whereas the noise HMM needs only to be prepared from noise recorded in the actual environment for a time as short as 5 to 6 seconds, for instance, and around 20 seconds at the longest, and the noise HMM can be made in one second or so. The time in which to record the environmental noise, prepare the noise HMM, combine the noise and speech HMMs into the noise-resistant speech HMM and recognize the incoming speech by the use of the noise-resistant speech HMM is as short as one minute or so (shorter when high-speed computing means is used).

This conventional method is, however, entirely ineffective against multiplicative distortion in the linear spectral domain which occurs in the speech signal through its transmission over a telephone line and cannot be said to be satisfactorily effective against additive noise.

An object of the present invention is to provide a method for the composition of noise-resistant Bidden Markov Models for speech recognition with which it is possible to achieve a high recognition rate even for speech subjected to multiplicative distortion in the linear spectral domain as well as to additive noise, and which can be made relatively easily and in a short time.

Another object of the present invention is to provide a speech recognizer which achieves high recognition performance even for speech subjected to multiplicative distortion as well as to additive noise and permits relatively easy and fast composition of noise-resistant HMMs for speech recognition.

SUMMARY OF THE INVENTION

The method for the composition of noise-resistant HMMs for speech recognition according to the present invention comprises: a first step of preparing from a speech HMM unaffected by noise or multiplicative distortion (hereinafter generically called noise) and a HMM made from noise (noise HMM) an incomplete noise-resistant speech HMM containing the multiplicative distortion in a linear spectral domain or SN ratio (Signal-to-Noise ratio) as an unknown variable; a second step of estimating the multiplicative distortion or SN ratio which maximizes the likelihood of the incomplete noise-resistant HMM for incoming speech; and a third step of substituting the estimated value into the incomplete noise-resistant HMM to complete a noise-resistant speech HMM.

The first step is a step of obtaining the incomplete noise-resistant speech HMM by combining the speech and noise HMMs in the product space.

The combining of the speech and noise HMMs in the product space is carried out by a fourth step of transforming the distributions of their output probabilities to the linear spectral domain, a fifth step of convoluting the distributions of the output probabilities of the speech and noise HMMs in the linear spectral domain, and a sixth step of inversely transforming the convoluted value to the original speech HMM domain.

The output probability distributions of the speech and noise HMMs represented in the cepstral domain are cosine-transformed and then exponentially transformed, and the sixth step is a step of logarithm-transforming the convoluted value and then inversely cosine-transforming it.

The fourth step is a step of exponentially transforming the output probability distributions of the speech and noise HMMs represented in the logarithm spectral domain, and the sixth step is a step of logarithm-transforming the convoluted value.

The combining of the speech and noise HMMs in the product space is carried out by the convolution of the output probability distributions of the speech and noise HMMs represented in the linear spectral domain.

The second step is a step of multiplying each incomplete noise-resistant speech HMM by a different multiplicative distortion or SN ratio, calculating the likelihood of each incomplete noise-resistant speech HMM for the incoming speech and estimating the multiplicative distortion or SN ratio that provides the maximum likelihood.

The second step is a step of making the estimation by a repetitive operation based on a maximum likelihood or steepest descent method.

The noise HMM to be used in the first step is prepared from recorded environmental noise.

The convolution of the output probability distributions of the speech and noise HMMs in the linear spectral domain is conducted by multiplying the linear spectrum of the speech HMM distribution by an unknown multiplicative distortion.

The convolution of the output probability distributions of the speech and noise HMMs in the linear spectral domain is carried out by multiplying the linear spectrum of the speech HMM distribution by $10^{-(S/N)/2}$ or multiplying the linear spectrum of the noise HMM distribution by $10^{(S/N)/2}$ (where S/N is an unknown variable).

The combining of the speech and noise HMMs in the product space is carried out by adding an unknown multiplicative distortion component to each cepstrum of the speech HMM output probability distribution represented in the cepstral domain.

The combining of the speech and noise HMMs in the product space is carried out by adding an unknown SN ratio component to the 0-order of the cepstrum of the output probability of one of the speech and noise HMMs represented in the logarithm spectral domain.

The combining of the speech and noise HMMs in the product space is carried out by adding an unknown multiplicative distortion component to the logarithm spectrum of the speech HMM output probability distribution represented in the logarithm spectral domain.

The combining of the speech and noise HMMs in the product space is carried out by adding an unknown SN ratio component to the logarithm spectrum of the output probability distribution of one of the speech and noise HMMs represented in the logarithm spectral domain.

The speech recognizer of the present invention recognizes incoming speech through the use of noise-resistant speech HMMs prepared from speech and noise HMMs by the above-mentioned method of the invention. In a speech HMM storage part there are stored sets of speech HMMs unaffected by noise and multiplicative distortions. Ambient noises are input by noise input means and noise HMMs are prepared by noise HMM preparing means from the input noises and are stored in a noise HMM storage part. The thus stored noise HMM, the speech HMM from the speech HMM storage part and an SN ratio or multiplicative distortion from the SN ratio or multiplicative distortion storage part are combined by incomplete noise-resistant speech HMM composing means in the product space into an incomplete noise-resistant speech HMM, using the SN ratio or multiplicative distortion as an unknown variable. The unknown variable of the incomplete noise-resistant speech HMM is estimated by SN ratio or multiplicative distortion estimating means in such a manner as to maximize the likelihood of the incomplete noise-resistant speech HMM for the incoming speech input via speech input means. The value of the thus estimated SN ratio or multiplicative distortion is substituted by noise-resistant speech HMM completing means into the incomplete noise-resistant speech HMM to obtain a noise-resistant speech HMM, which is stored in a noise-resistant speech EMM storage part. The similarity between the input speech and the noise-resistant speech HMM is calculated by speech recognizing means, which outputs the result of recognition based on the calculation.

BRIEF DESCRIPTION OF THE DRAWINGS

FIG. 3 is a diagram schematically showing speech and noise HMMs and each state transition of a noise-resistant speech HMM composed by combining them;

FIG. 4 is a functional block diagram of an embodiment of the speech recognizer according to the present invention;

DESCRIPTION OF THE PREFERRED EMBODIMENT

Figure 5A:
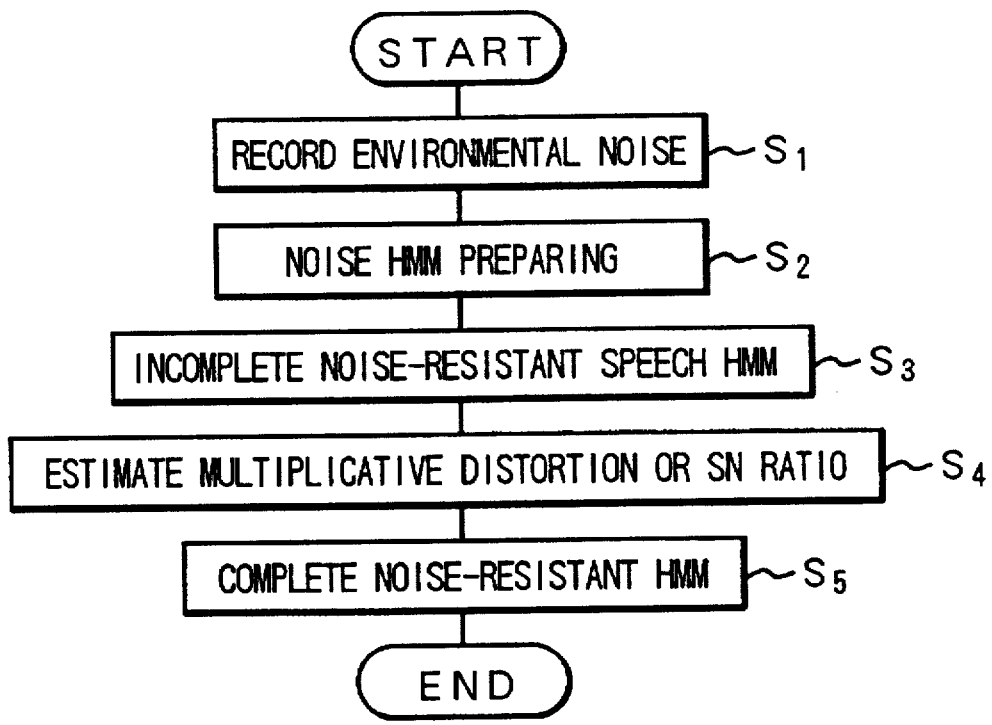
FIG. 5A is a flowchart showing the procedure of an embodiment of the noise-resistant speech HMM preparing method according to the present invention.

FIG. 4 illustrates an example of the functional configuration of the speech recognizer according to the present invention and FIG. 5A shows the procedure in one example of this invention method.

In speech HMM storage part 3 there are sets of speech HMMs prepared from speech information recorded in noise-free conditions. Environmental noise is recorded via noise input means 5 ($S_1$) and noise HMMs are prepared by noise HMM preparing means 6 from the recorded environmental noise ($S_2$). The noise HMMs can be produced by the same technique as that for the generation of the speech HMM—this is disclosed in, for example, S. E. Levinson, L. &. Rabinen, and M. M. Sondhi, "An Introduction to the Application of the Theory of Probabilistic Functions of a Markov Process to Automatic Speech Recognition," The Bell System Technical Journal, Vol. 62, No. 4 (April 1983). The noise HMMs thus prepared are stored in a noise HMM storage part 7. Let it be assumed that the noise HMM stored in the noise HMM storage part 7 are represented by the same feature parameter as that for the speech HMMs stored in the speech HMM storage part 3; that is, when the speech HMMs are represented in the cepstral domain, for instance, the noise HMMs are also represented in the cepstral domain.

In incomplete noise-resistant speech HMM composing means 8, an incomplete noise-resistant speech HMM containing, as an unknown variable, a multiplicative distortion or SN ratio in the linear spectral domain stored in the SN ratio or multiplicative distortion storage part 9 is composed from the noise HMM in the noise HMM storage part 7 and the speech HMM in the speech HMM storage part 3 ($S_3$). The incomplete noise-resistant speech HMM is composed by combining the noise and speech HMMs in the product space, in which case the speech HMM is multiplied by or added with an unknown multiplicative distortion, or the speech or noise HMM is multiplied by or added with an unknown SN ratio.

Figure 1:
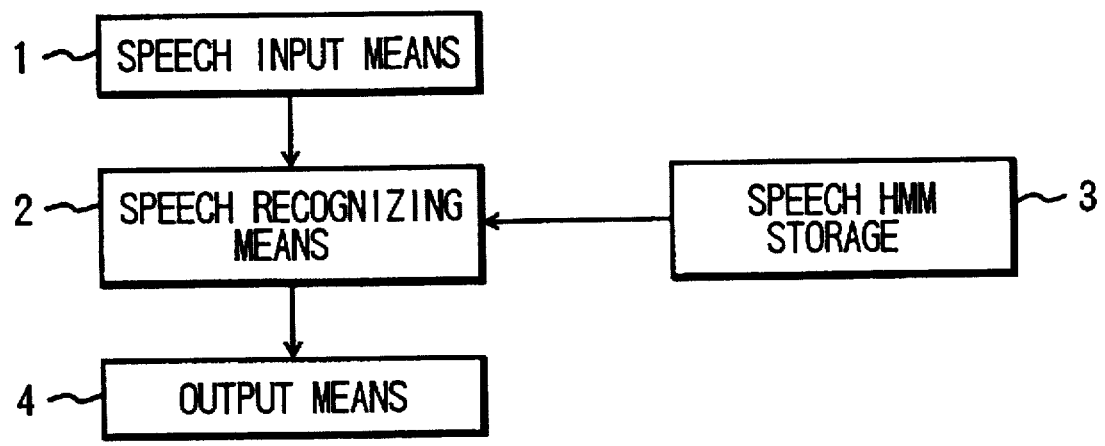
FIG. 1 is a functional block diagram of a speech recognizer.
Figure 2:
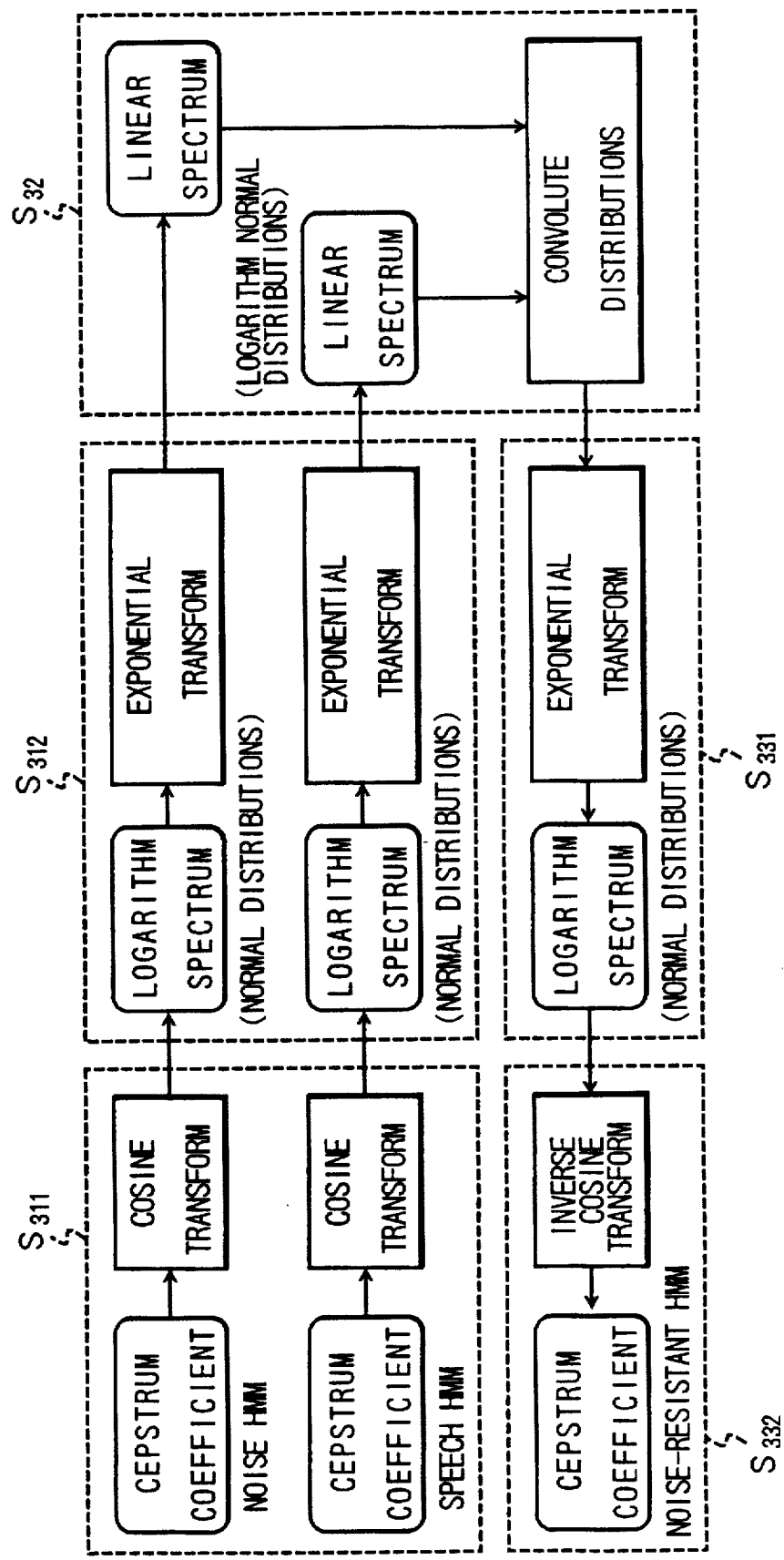
FIG. 2 is a flowchart illustrating a conventional noise-resistant speech HMM preparing procedure.
Figure 5B:
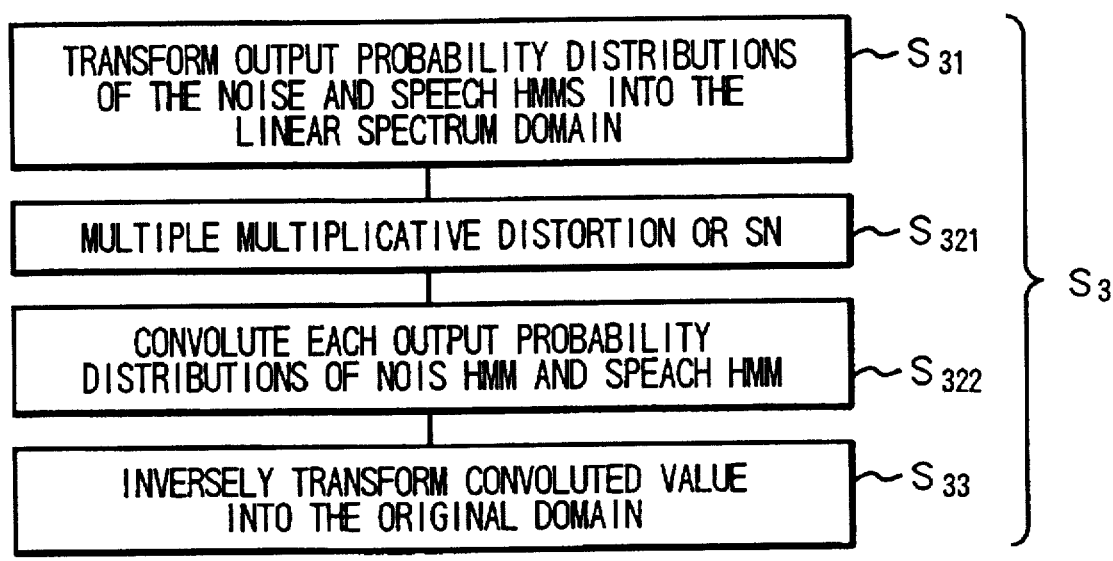
FIG. 5B is a flowchart showing a concrete example of the procedure of step S3 in FIG. 5A.
Figure 6:
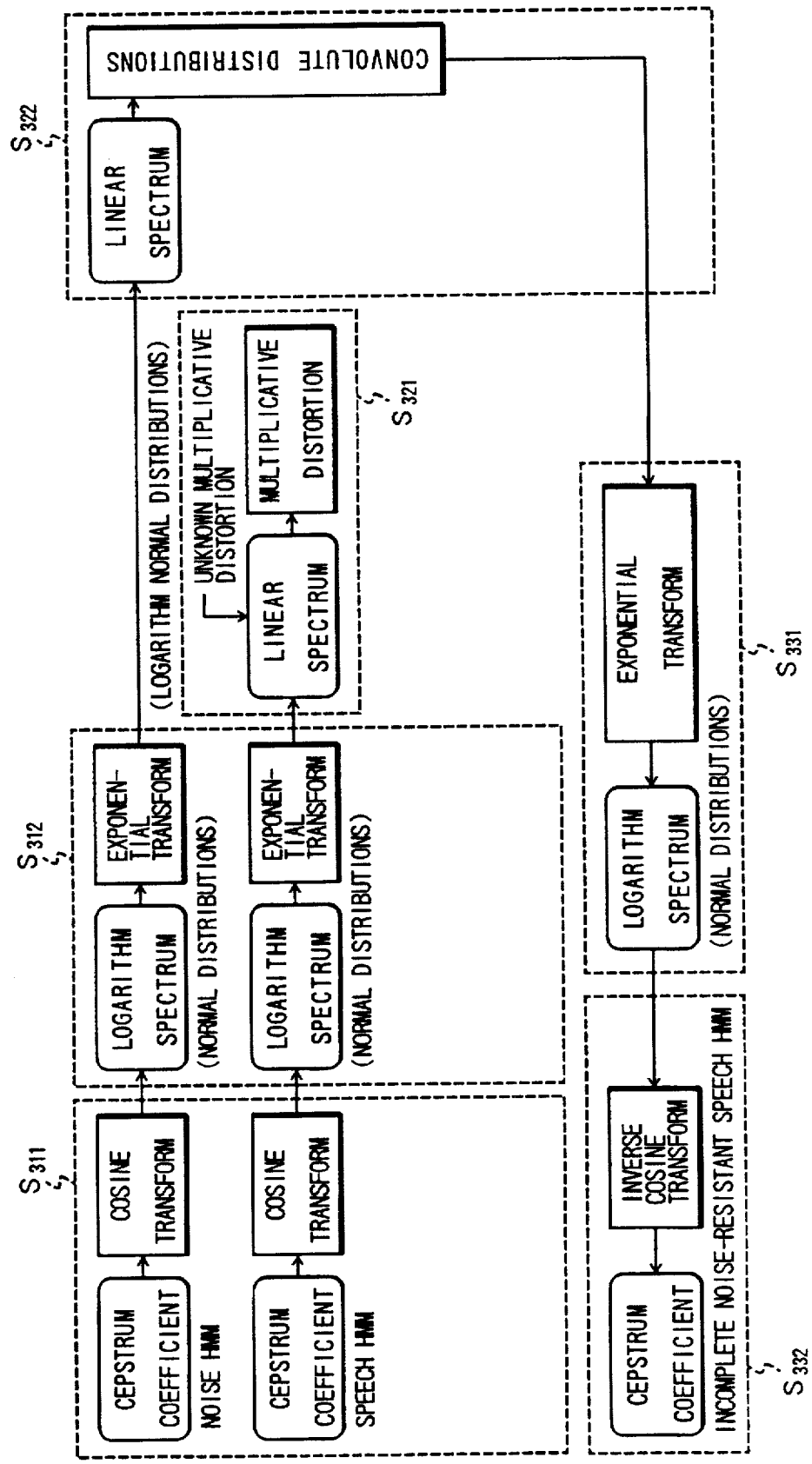
FIG. 6 is a flowchart showing another concrete example of the procedure of FIG. 5B.

The combining of the noise and speech HMMs in the product space is carried out in the same manner as in the past, for example, as shown in FIG. 5B. The output probability distributions of the noise and speech HMMs are transformed into the linear spectral domain ($S_{31}$) and these output probability distributions of the noise and speech HMMs in the linear spectral domain are convoluted. In this instance, the linear spectrum of the output probability distribution of the speech HMM in the linear spectral domain is multiplied by a multiplicative distortion (an unknown variable), or the linear spectrum of the output probability distribution of one of the speech and noise HMMs in the linear spectral domain is multiplied by a component (an unknown variable) corresponding to the SN ratio ($S_{321}$), after which the multiplied output probability distribution and the non-multiplied one are convoluted ($S_{322}$) and the convoluted value is inversely transformed into the original domain to obtain the incomplete noise-resistant speech HMM ($S_{33}$). In FIG. 6 there is shown a concrete example of this invention method on the assumption that the speech and noise HMMs are both prepared in the cepstral domain as described previously with respect to the conventional method. In FIG. 6 the parts corresponding to those in FIG. 2 are identified by the same reference numerals. The mean values C and D of the speech and noise HMM output probabilities are given by Eqs. (1) and (2) and they are cosine transformed to logarithm spectra LC and LD, respectively, and the covariances of both distributions are also transformed to $\Sigma^{LC}$ and $\Sigma^{LD}$ ($S_{311}$); further, these values are transformed to mean values $SC^i$ and $SD^i$ and covariances $\Sigma^{SD}_{ij}$ and $\Sigma^{SD}_{ij}$ ($S_{312}$). Incidentally, it is well-known in the field of ordinary communications that the output X of speech S uttered in the presence of environmental noise N, for example, picked up by a microphone and transmitted over a transmission line, is expressed by X=WS+N, where W represents distortion that the output X undergoes in the microphone and the transmission line. In view of this, according to this embodiment, the output probability distribution of the speech HMM is multiplied by an unknown multiplicative distortion in a multiplicative distortion storage part 9 (FIG. 4) ($S_{321}$) and the multiplied distribution and the noise HMM are convoluted ($S_{322}$). That is, the following equations are computed in place of Eqs. (11) and (12):

$$M^i = W_i SC^i + SD^i \quad (17)$$

$$\Sigma^M_{ij} = W_i W_j \Sigma^{SC}_{ij} + \Sigma^{SD}_{ij} \quad (18)$$

The convoluted values $M^i$ and $\Sigma^M_{ij}$ are subjected to the logarithm transformation by Eqs. (13) and (14) ($S_{331}$) as in the case of FIG. 2 and they are further subjected to the inverse cosine transformation by Eqs. (15) and (16) to obtain an incomplete noise-resistant speech HMM containing the multiplicative distortion as an unknown variable in the original cepstral domain ($S_{332}$).

Next, the multiplicative distortion W (=$W_1, \ldots, W_m$), which is an unknown variable in the thus obtained incomplete noise-resistant speech HMM, is estimated (FIG. 5A, $S_4$). Speech is input via speech input means 1 (FIG. 4) into SN ratio or multiplicative distortion estimating means 10, by which, for the input speech sequence X, an estimation is made of the multiplicative distortion W that maximizes the likelihood P(X|M(W)) of a set M(W) of incomplete noise-resistant speech HMMs. This estimation can made by a repetitive operation based on a steepest descent method or maximum likelihood method.

To maximize the likelihood P(X|M(W)) by the steepest descent method, the following repetitive operation is carried out.

1. Initialize W;
2. Estimate the next $W^t$ by $$W^t = W^{t-1} + \epsilon \frac{\partial P(X|M(W))}{\partial W} \; ;$$

3. Update $W^{t-1}$ with $W^t$; and
4. Repeat steps 2 and 3 until $W^t$ converges.

Here, $\epsilon$ is set to an appropriate small value.

The likelihood P(X|M(W)) can be maximized by the maximum likelihood method in such a manner as mentioned below.

In general, the following equation holds between the trellis likelihood and the Viterbi likelihood:

$$P(X|M(W)) = \Sigma P(X, S|M(W))$$

where $\Sigma$ represents the sum of likelihoods for all the states of transition S.

Further, Q(W, W') is defined as shown below, with the updated value of W represented by W'.

$$Q(W, W') = \Sigma P(X, S|M(W)) \log P(X, S|M(W'))$$

where $\Sigma$ represents the sum of likeihoods for all the states of transition S.

If Q(W, W')≧Q(W, W), then P(X|M(W'))≧P(X|M(W)) holds. The estimation of distortion W that utilizes this principle and the maximum likelihood method is made as follows:

1. Initialize W;
2. Estimate $W^t$ that maximizes Q($W^{t-1}$, $W^t$) by the maximum likelihood method;
3. Update $W^{t-1}$ with $W^t$; and
4. Repeat steps 2 and 3 until $W^t$ converges.

The value of the multiplicative distortion W thus estimated is substituted by HMM completing means 11 (FIG. 4) into each incomplete noise-resistant speech HMM to obtain a complete noise-resistant speech HMM, which is stored in a noise-resistant speech HMM storage part 12 (FIG. 5A, $S_5$). The recognition of unknown speech is performed by inputting the unknown speech via the speech input means 1, calculating its similarity to each noise-resistant speech HMM in the noise-resistant speech storage part 12 by speech recognizing means 2 and outputting at output means 4 the result of recognition or observation based on the calculation. The input speech X that is used for the estimation of the multiplicative distortion need not always be training speech but may be the unknown speech to be recognized. In the latter case, the estimation of the multiplicative distortion is followed by the above-mentioned speech recognizing process for the unknown speech.

Figure 7:
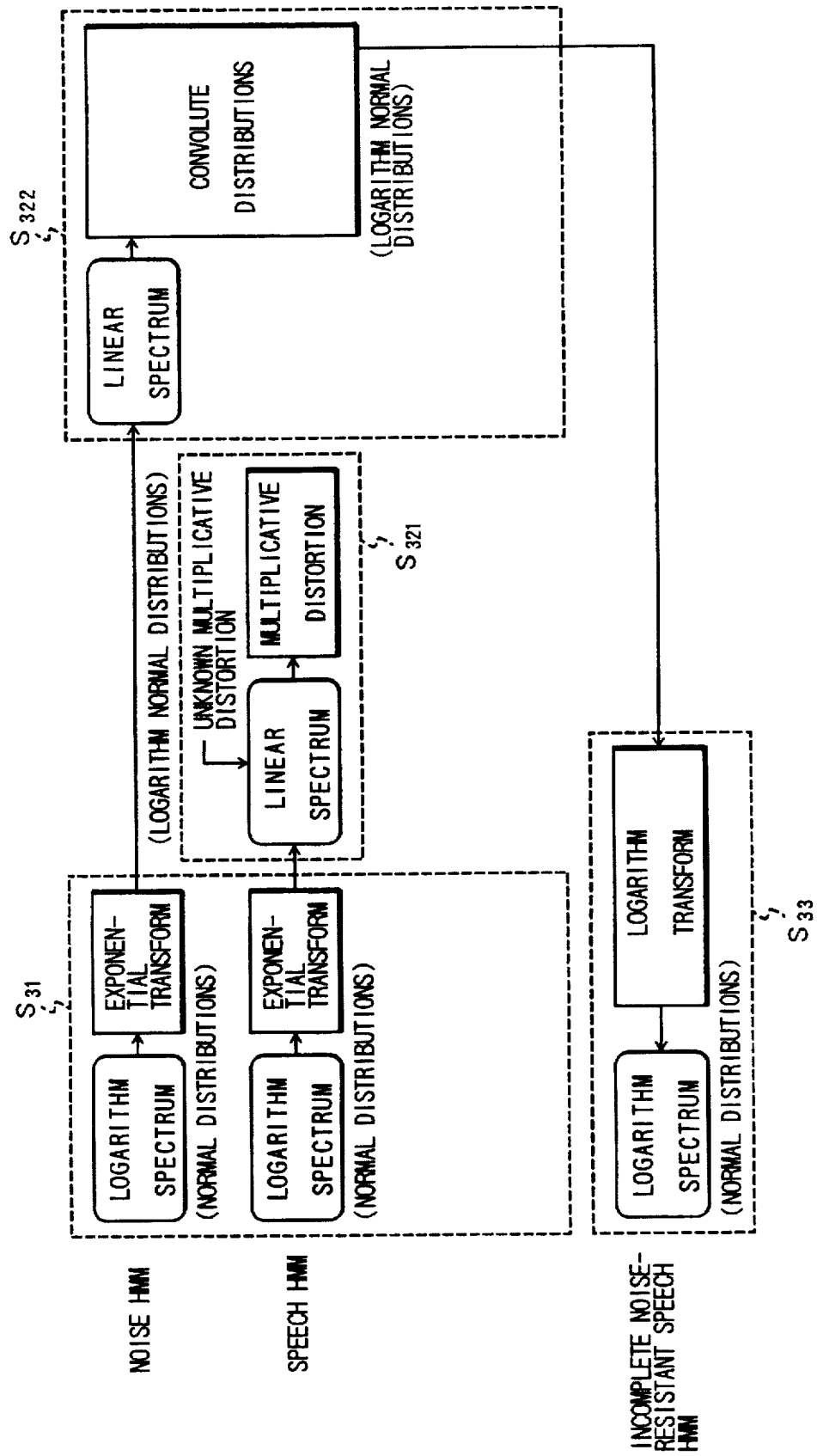
FIG. 7 is a flowchart showing still another example of the procedure of FIG. 5B.

While in the above the speech and noise HMMs have been described to be made in the cepstral domain, the present invention is also applicable to the case where they are made in the logarithm spectrum (logarithm power spectrum) domain. In this instance, as depicted in FIG. 7, the exponential transformation in step $S_{312}$ in FIG. 6 is carried out for the distributions of the noise and speech HMMs in the logarithm spectral domain to obtain their distributions in the linear spectral domain ($S_{31}$), then the linear spectrum of the speech HMM distribution is multiplied by the multiplicative distortion W ($S_{321}$) and the multiplied speech HMM distribution and the noise HMM distribution are convoluted ($S_{32}$) and the convoluted value is subjected to a logarithm transformation to obtain an incomplete noise-resistant speech HMM ($S_{33}$).

Similarly, when the speech and noise HMMs are made in the linear spectral domain, their distributions are convoluted to directly obtain the incomplete noise-resistant speech HMM.

Moreover, although in the above the multiplicative distortion W is introduced as an unknown variable into the incomplete noise-resistant speech HMM, the SN ratio may also be used. In this case, the SN ratio is introduced, as shown in the following equations, into the mean value $M^i$ and covariance $\Sigma^M_{ij}$ of the distribution of the incomplete noise-resistant speech HMM obtained by the convolution of the speech and noise HMM distributions:

$$M^i = SC^i + kSD \quad (19)$$

$$\Sigma^M_{ij} = \Sigma SC_{ij} + k^2 \Sigma^{SD}_{ij} \quad (20)$$

$$k = 10^{-((S/N)/2)} \quad (21)$$

Figure 8:
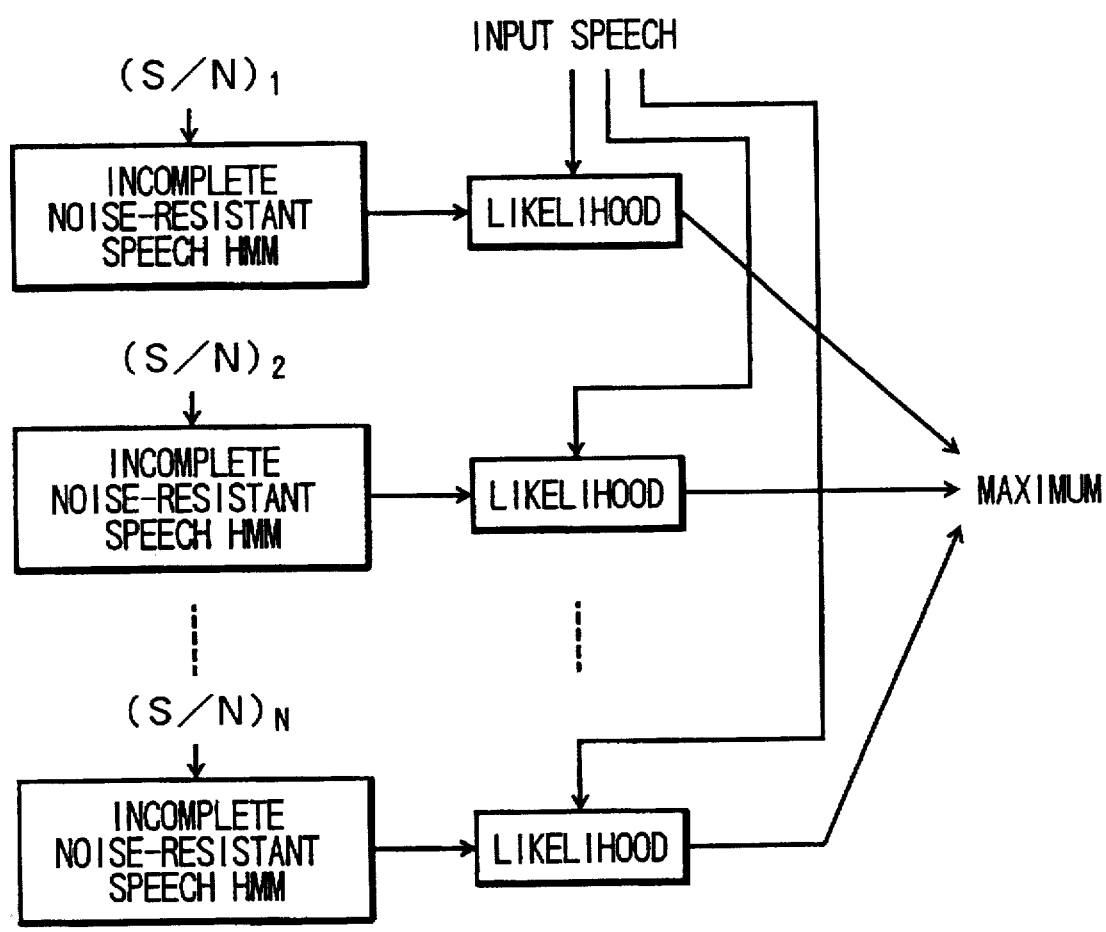
FIG. 8 is a diagram illustrating an example of a technique for estimating the SN ratio of an incomplete noise-resistant speech HMM.

In this instance, the unknown variable k, not the multiplicative distortion W, is stored in the SN ratio or multiplicative distortion storage part 9 in FIG. 4, and the multiplication in step $S_{321}$ in FIGS. 5B, 6 and 7 is done by multiplying the noise HMM distribution (or speech HMM distribution) by the unknown variable k. That is, the operations of Eqs. (19), (20) and (21) are carried out. Further, an SN ratio that maximizes the likelihood P(X|M(S/N)) is chosen by the SN ratio or multiplicative distortion estimating means 10 in FIG. 4. In other words, the SN ratio that maximizes the likelihood of the set M(S/N) of incomplete noise-resistant speech HMMs which is a function of the SN ratio is estimated for the input speech sequence X. The input speech in this case may preferably be training speech uttered in the environment where the noise HMM was prepared, or the speech to be recognized. This estimation of the SN ratio can also be made by the repetitive operation through utilization of the maximum likelihood estimation method that maximizes the likelihood P(X|M(S/N)), or the steepest descent method. FIG. 8 shows another example of the estimation of the SN ratio. N SN ratios $(S/N)_1$ to $(S/N)_N$ are prepared and substituted into Eqs. (19), (20) and (21) to obtain N incomplete noise-resistant speech HMMs, then their likelihoods P(X|M(S/N)) for the input speech are calculated and the SN ratio that provides the maximum one of the N likelihoods is selected.

The SN ratios $(S/N)_1$ to $(S/N)_N$ used in this case are, for example, three values such as a ratio, (S+N)/N, of the sum of the signal S and the noise N to the noise N obtained in the environment of recording the noise for preparing the noise HMM and values obtained by adding the above-said value with 3 dB and subtracting therefrom 3 dB. The likelihood P(X|M(S/N)) is calculated for each of the three values and the SN ratio that provides the maximum likelihood is determined.

It is also possible to adopt the formulation that maximizes the likelihood P(X, S|M(S/N)) by the Viterbi algorithm, where S represents the state transition of the HMM. The multiplicative distortion W may also be made in the manner described above with respect to FIG. 8.

While in the above the introduction of the multiplicative distortion W and SN ratio of the incomplete noise-resistant speech HMM is made in the linear spectral domain, it is also possible to use a scheme that adds the multiplicative distortion W to Eq. (1), that is, calculates $C+W=(C_0+W_0, C_1+W_1, \ldots, C_p+W_p)$, and combines the speech HMM added with this multiplicative distortion W and the noise HMM in the product space. Further, it is possible to calculate $C+k=(C_0+k, C_1, \ldots, C_p)$ (where $k=\alpha\log(10^{(S/N)/2})$ and $\alpha$ is a constant dependent on the cosine transformation) and combine the speech HMM added with the unknown variable k and the noise HMM in the product space; in this case, it is also possible to add the unknown variable k to the noise HMM and combine it with the speech HMM without the unknown variable k in the product space. Moreover, the multiplicative distortion W or SN ratio may also be introduced in the logarithm spectral domain. That is, it is possible to calculate LC+W=C(COS)+W and combine it with the mean value LD in the product space, or to calculate $LC+k=(LC_0+k, LC_1+k, \ldots, LC_p+k)$ (where $k=\log(10^{(S/N)/2})$ and combine it with the mean value LD in the product space, or to calculate LC+k and combine it with the mean value LD in the product space.

Although in the above the noise HMM is prepared in the same domain as that of the speech HMM, the latter may be prepared in the cepstral domain and the former in the logarithm spectral domain. In this instance, the computational complexity decreases by the amount of operation for transforming noise from the cepstral domain to the logarithm spectrum domain.

As described above, the present invention composes the noise-resistant speech HMM by: preparing the noise HMM from noise at the place of utterance; preparing the incomplete noise-resistant speech HMM containing the SN ratio or multiplicative distortion as an unknown variable, from the noise HMM and the speech HMM based on speech information pre-recorded in noise-free conditions; and determining the SN ratio or multiplicative distortion that maximizes the likelihood of the incomplete noise-resistant speech HMM for incoming speech. This permits the composition of speech HMMs robust against a change of the SN ratio, a microphone distortion, a circuit distortion and a change in the utterance of the speaker. That is to say, as compared with the prior art, the speech recognizer of the present invention has higher success in the recognition of speech added with noise or speech distorted during transmission over a telephone line or the like.

By introducing the multiplicative distortion into the speech HMM as an unknown variable and combining the speech HMM with the noise HMM in the product space, or by introducing the SN ratio into one of the speech and noise HMMs and combining it with the other HMM in the product space, it is possible to compose the incomplete noise-resistant speech HMM that models noise-added speech. Moreover, by determining the multiplicative distortion or SN ratio which maximizes the likelihood of the HMM for the input speech, the noise-resistant speech HMM can be obtained.

Furthermore, the above-mentioned incomplete noise-resistant speech HMM can be obtained by transforming the speech and noise HMMs to those in the linear spectral domain, causing the multiplicative distortion to the output probability distribution of the speech HMM in the linear spectral domain, convoluting such a speech HMM output probability distribution and the output probability distribution of the noise HMM, and inversely transforming the convoluted value back to the original domain of the speech HMM. Similarly, by transforming the speech and noise HMMs to those in the linear spectral domain, multiplying the output probability distribution of either one of the speech and noise HMMs in the linear spectral domain by the SN ratio component, convoluting the multiplied output probability distribution and the other non-multiplied output probability distribution, and inversely transforming the convoluted value back to the original speech HMM domain.

As described above, the output probability distributions of the speech and noise HMMs represented in the cepstral domain are transformed to those in the linear spectral domain by the cosine transformation and the exponential transformation, then the transformed distributions are convoluted and the convoluted value is subjected to the logarithm transformation inverse to the exponential transformation and the inverse cosine transformation, by which the incomplete noise-resistant speech HMM distribution in the cepstral domain can be calculated. Alternatively, the output probability distributions of the speech and noise HMMs represented in the logarithm spectral domain are exponential-transformed and convoluted and the convoluted value is logarithm-transformed to obtain the incomplete noise-resistant speech HMM in the logarithm spectral domain.

To judge the effectiveness of the method and apparatus of the present invention, phoneme recognition tests were conducted. The evaluation data used was 51 directory assistance sentences uttered by one speaker. The voices used in the tests were those added with 12- and 6-dB noises and distorted by multiplicative distortion. The test results are given in the following table. The models used were all those in the cepstral domain, and in the "Speech HMM" test, raw speech HMMs, that is, the speech HMMs stored in the speech HMM storage part 3 in FIG. 4 were used. The "HMM Composition Alone" test was one that used HMMs obtained with the noise-resistant speech HMM composing method proposed in Literature 1 mentioned previously in Background of the Invention. The "HMM+S/N Estimation" test was one that used HMMs composed with the SN ratio introduced as an unknown variable according to this invention method. The "HMM Composition+Multiplicative Distortion Estimation" test was one that used HMMs composed with the multiplicative distortion introduced as an unknown variable according to this invention method. The estimation of the SN ratio and multiplicative distortion in the HMM composition by this invention method was made by the steepest descent method. As will be understood from the test results, the conventional composed HMM has a higher success in recognition than the raw speech HMM and the method of the present invention provides noise-resistant speech HMMs of increased resistance to the additive noise and is far more robust against the multiplicative distortion than in the prior art; hence, the invention improves the recognition rate.

| S/N | Speech HMM | HMM Composition Alone | HMM Composition + S/N Estimation | HMM Composition + Multiplicative Distortion Estimation |
|---|---|---|---|---|
| 6 dB | 28.4% | 32.5% | 37.0% | 53.4% |
| 12 dB | 44.7% | 50.7% | 56.5% | 67.3% |

As described above, according to the present invention, a noise model in the environment of utterance is used and combined with the conventional speech HMM to obtain the incomplete noise-resistant speech HMM containing the multiplicative distortion or SN ratio as an unknown variable, and the unknown variable that maximizes the likelihood of the HMM for the input speech is estimated; hence, it is possible to compose robust speech HMMs suitable to the environment of utterance. The speech recognizer of the present invention, which uses such HMMs, naturally has high success in recognition. In addition, according to the speech recognizer of the present invention, the time from the preparation of the noise HMM to the recognition of the input speech is, for instance, ohly one minute or so (shorter when using a high-speed arithmetic unit). Thus the speech recognition can be carried out in a short time and with relatively simple processing.

It will be apparent that many modifications and variations may be effected without departing from the scope of the novel concepts of the present invention.

What is claimed is:

1. A method for the composition of noise-resistant Hidden Markov Models (HMMs) for speech recognition, comprising:

a first step of preparing, from speech HMMs which have been produced from speech information free of noise or multiplicative distortion and noise HMMs which have been produced from environmental noise, incomplete noise-resistant speech HMMs each containing said multiplicative distortion or an SN (Signal-to-Noise) ratio in a linear spectral domain as an unknown variable;

a second step of estimating said multiplicative distortion or SN ratio that maximizes the likelihood of each of said incomplete noise-resistant speech HMMs for input speech; and a third step of substituting said estimated values into said incomplete noise-resistant speech HMMs to complete said noise-resistant speech HMMs and storing said noise-resistant speech HMMs in a storage means for subsequent use in the recognition of input speech.

2. The method of claim 1, wherein said first step comprises: a fourth step of adding said multiplicative distortion to each of said speech HMMs; and a fifth step of combining said each speech HMM added with said multiplicative distortion and each of said noise HMMs in a product space.

3. The method of claim 2, wherein said fourth step is a step of adding said multiplicative distortion to a mean value of the output probability distribution of said speech HMMs represented in a cepstral domain.

4. The method of claim 2, wherein said fourth step is a step of adding said multiplicative distortion to a means value of the output probability distribution of said speech HMMs represented in a logarithm spectral domain.

5. The method of claim 1, wherein said first step comprises: a fourth step of adding one of said speech and said noise HMMs with a component containing said SN ratio; and a fifth step of combining said one HMM added with said component and the other HMM in a product space.

6. The method of claim 5, wherein said fourth step is a step of adding said component containing said SN ratio to the 0-order term of a mean value of the output probability distribution of said speech HMMs represented in a cepstrum domain.

7. The method of claim 5, wherein said fourth step is a step of adding said component containing said SN ratio to a mean value of the output probability distribution of said speech HMMs represented in a logarithm spectral domain.

8. The method of claim 1, wherein said first step comprises: a sixth step of transforming the output probability distributions of said speech and noise HMMs to said linear spectral domain; a seventh step of multiplying said output probability distribution of said speech HMMs in said linear spectral domain by said multiplicative distortion; an eighth step of convoluting said output probability distribution of said speech HMMs multiplied by said multiplicative distortion and said output probability distribution of said noise HMMs in said linear spectral domain; and a ninth step of inversely transforming said convoluted value to the original domain of said speech HMMs.

9. The method of claim 1, wherein said first step comprises: a sixth step of transforming the output probability distributions of said speech and noise HMMs to said linear spectral domain; a seventh step of multiplying said output probability distribution of one of said speech and noise HMMs in said linear spectral domain by a component containing said SN ratio; an eighth step of convoluting said output probability distribution of said one HMM multiplied by said component and said output probability distribution of the other HMM; and a ninth step of inversely transforming said convoluted value to the original domain of said speech HMMs.

10. The method of claim 8 or 9, wherein said sixth step is a step of cosine-transforming said output probability distributions of said speech and noise HMMs represented in said cepstral domain and exponentially transforming said cosine-transformed output probability distributions of said speech and noise HMMs and said ninth step is a step of logarithm-transforming said convoluted value and inversely cosine-transforming said logarithm-transformed convoluted value.

11. The method of claim 8 or 9, wherein said sixth step is a step of exponentially transforming said output probability distributions of said speech and noise HMMs represented in said logarithm spectral domain and said ninth step is a step of logarithm-transforming said convoluted value.

12. The method of claim 1, wherein said first step comprises: a fourth step of multiplying the output probability distribution of said speech HMMs represented in said linear spectral domain by said multiplicative distortion; and a step of convoluting said output probability distribution multiplied by said multiplicative distortion and the output probability distribution of said noise HMMs represented in said linear spectral domain.

13. The method of claim 1, wherein said first step comprises: a fourth step of multiplying the output probability distribution of one of said speech and noise HMMs represented in said linear spectral domain by a component containing said SN ratio; and a fifth step of convoluting said output probability distribution of said one HMM multiplied by said component and said output probability distribution of the other HMM.

14. The method of claim 5, 9, or 13, wherein said component containing said SN ratio is $10^{(S/N)/2}$.

15. The method of any one of claims 1 to 9, 12 or 13, wherein said second step is a step of making said estimation by a repetitive operation based on a maximum likelihood estimation method.

16. The method of any one of claims 1 to 9, 12 or 13, wherein said second step is a step of making said estimation by a repetitive operation based on a steepest descent method.

17. The method of any one of claims 1 to 4, 8 or 12, wherein said second step is a step of multiplying each of said incomplete noise-resistant speech HMMs by a different multiplicative distortion, calculating the likelihood of said each incomplete noise-resistant speech HMM for said input speech, and estimating the value of the multiplicative distortion corresponding to that one of said incomplete noise-resistant speech HMMs which has the maximum likelihood.

18. The method of any one of claims 1, 5 to 7, 9 or 13, wherein said second step is a step of multiplying each of said incomplete noise-resistant speech HMMs by a different SN ratio, calculating the likelihood of said each incomplete noise-resistant HMM for said input speech, and estimating the value of the SN ratio corresponding to that one of said incomplete noise-resistant speech HMMs which has the maximum likelihood.

19. The method of any one of claims 1 to 9, 12 or 13, which further comprises a step of recording noise in an actual environment which affects the speech to be recognized, and preparing therefrom said noise HMMs for use in said first step.

20. The method of any one of claims 1 to 3, 5, 6, 8 or 9, wherein said speech HMMs are represented in said cepstral domain and said noise HMMs are represented in a logarithm spectral domain.

21. A speech recognizer which uses noise-resistant speech HMMs composed of speech HMMs unaffected by noise or multiplicative distortion and noise HMMs, comprising:

a speech HMM storage part having stored therein a set of said speech HMMs;

a noise HMM storage part having stored therein said noise HMMS;

a noise-resistant speech HMM storage part for storing said set of noise-resistant speech HMMs;

a multiplicative distortion or SN ratio storage part having stored therein multiplicative distortions or SN ratios which are unknown variables;

noise input means for recording noise of the same environment as that of the speech to be recognized;

noise HMM preparing means for preparing said noise HMMs from said noise recorded by said noise input means and for storing said noise HMMs in said noise storage part;

incomplete noise-resistant speech HMM preparing means for preparing incomplete noise-resistant speech HMMs each containing said multiplicative distortion or SN ratio as an unknown variable from said noise HMMs stored in said noise HMM storage part, said speech HMMs stored in said speech HMM storage part and said multiplicative distortions or SN ratios stored in said multiplicative distortion or SN ratio storage part;

speech input means for inputting therethrough said speech to be recognized;

multiplicative distortion or SN ratio estimating means for estimating said multiplicative distortion or SN ratio corresponding to that one of said incomplete noise-resistant speech HMMs which has the maximum likelihood for said speech inputted via said speech input means;

noise-resistant speech HMM composing means for composing said set of noise-resistant speech HMMs by substituting said estimated multiplicative distortion or SN ratio into said incomplete noise-resistant speech HMMs and for storing said set of noise-resistant speech HMMs in said noise-resistant speech HMM storage part; and speech recognizing means for calculating the similarity between said speech to be recognized, inputted via said speech input means, and each of said noise-resistant speech HMMs in said noise-resistant speech HMM storage part and for outputting the result of recognition based on said calculation.

* * * * *